(12) United States Patent
Yanagishima

(10) Patent No.: US 7,548,049 B2
(45) Date of Patent: Jun. 16, 2009

(54) SWITCHING REGULATOR

(75) Inventor: Daiki Yanagishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/961,439

(22) Filed: Dec. 20, 2007

(65) Prior Publication Data

US 2008/0150507 A1 Jun. 26, 2008

(30) Foreign Application Priority Data

Dec. 21, 2006 (JP) ............... 2006-343697

(51) Int. Cl.
*G05F 1/40* (2006.01)
(52) U.S. Cl. .................. 323/284; 323/283
(58) Field of Classification Search .......... 323/222, 323/271, 282, 283, 284, 290, 351
See application file for complete search history.

(56) References Cited

U.S. PATENT DOCUMENTS 6,465,993 B1 * 10/2002 Clarkin et al. ............. 323/272
6,987,410 B2 * 1/2006 Suda et al. ................ 327/165
7,230,406 B2 * 6/2007 Huang et al. .............. 323/284
2007/0296389 A1 * 12/2007 Chen et al. ................ 323/290

FOREIGN PATENT DOCUMENTS

JP 2006-033958 2/2006
JP 2006-246626 9/2006

* cited by examiner

*Primary Examiner*—Jessica Han
(74) *Attorney, Agent, or Firm*—Fish & Richardson P.C.

(57) ABSTRACT

A switching regulator is provided with: a comparator producing a comparison signal by comparing a feedback voltage commensurate with an output voltage with a predetermined reference voltage; an oscillator producing a clock signal at a predetermined frequency; a latch circuit producing a pulse width modulation signal with a desired duty factor based on the comparison signal and the clock signal; an output transistor for which switching control is performed based on the pulse width modulation signal, the output transistor having one end from which a switching voltage in the form of a rectangular wave is outputted; and a phase compensation circuit connected between an output terminal of the latch circuit and a feedback voltage input terminal of the comparator.

7 Claims, 4 Drawing Sheets

# SWITCHING REGULATOR

This application is based on Japanese Patent Application No. 2006-343697 filed on Dec. 21, 2006, the contents of which are hereby incorporated by reference.

BACKGROUND OF THE INVENTION

1. Field of the Invention

The present invention relates to switching regulators that produce a desired output voltage from an input voltage.

2. Description of Related Art

FIG. 4 is a circuit diagram showing an example of the configuration of a conventional switching regulator.

The conventional switching regulator having the configuration shown in this figure compares a predetermined reference voltage Vref with a feedback voltage Vfb commensurate with an output voltage Vo, and, based on the resultant comparison signal Sa and a predetermined clock signal Sb, produces a pulse width modulation signal Sc (hereinafter the "PWM (pulse width modulation) signal Sc") with a desired duty factor, and hence a gate signal Sd of an output transistor 101.

In the conventional switching regulator having the configuration shown in this figure, the output transistor 101 is turned on at the rising edge of the clock signal Sb, and is turned off at the falling edge of the comparison signal Sa.

Thus, from the source of the output transistor 101 having the drain to which an input voltage Vi is applied, a switching voltage Vsw in the form of a rectangular wave according to the on/off of the output transistor 101 is outputted. By smoothing the switching voltage Vsw, a desired output voltage Vo is produced.

Examples of conventional technologies related to what has been described thus far are seen in JP-A-2006-33958 (hereinafter "Patent Document 1") and JP-A-2006-246626 (hereinafter "Patent Document 2").

Patent Document 1 discloses and proposes a current-mode control type switching regulator that performs, to prevent a subharmonic oscillation, an appropriate amount of slope compensation by using the result of calculation performed on an input voltage and an output voltage.

Patent Document 2 discloses and proposes a current-mode control type switching regulator that performs, to prevent a subharmonic oscillation, an appropriate amount of slope compensation by using a voltage difference between an input voltage and an output voltage.

It is true that the conventional switching regulator having the configuration shown in FIG. 4 can produce a desired output voltage Vo from the input voltage Vi with a simple configuration.

However, in the conventional switching regulator configured as described above, there is a possibility that an inevitable delay developed in the operations of the comparator 102, the latch circuit 105, and the preliminary driver 106 makes an output operation unstable, or makes it impossible to obtain a desired oscillating frequency. In particular, the influence of such delay becomes apparent, and hence the above-described problems often arise, when an attempt is made to increase a switching frequency.

Conventionally, to solve the above-described problems, a speed-up capacitor C2 or the like is added externally. Doing so, however, unnecessarily increases the number of external devices, and thus increases costs.

Additionally, in the conventional switching regulator configured as described above, like the current-mode control type switching regulator, a subharmonic oscillation tends to occur when the ON duty of the output transistor 101 exceeds 50%, such as when a voltage difference between the input voltage Vi and the output voltage Vo is small (for example, output voltage Vo/input voltage Vi≧½). This unfavorably increases ripples, leading to a lower degree of output accuracy.

SUMMARY OF THE INVENTION

In view of the conventionally experienced problems described above, it is an object of the present invention to provide switching regulators that can produce a desired output voltage from an input voltage with stability and a high degree of accuracy.

To achieve the above object, according to the present invention, a switching regulator is provided with: a comparator producing a comparison signal by comparing a feedback voltage commensurate with an output voltage with a predetermined reference voltage; an oscillator producing a clock signal at a predetermined frequency; a latch circuit producing a pulse width modulation signal with a desired duty factor based on the comparison signal and the clock signal; an output transistor for which switching control is performed based on the pulse width modulation signal, the output transistor having one end from which a switching voltage in the form of a rectangular wave is outputted; and a phase compensation circuit connected between an output terminal of the latch circuit and a feedback voltage input terminal of the comparator.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
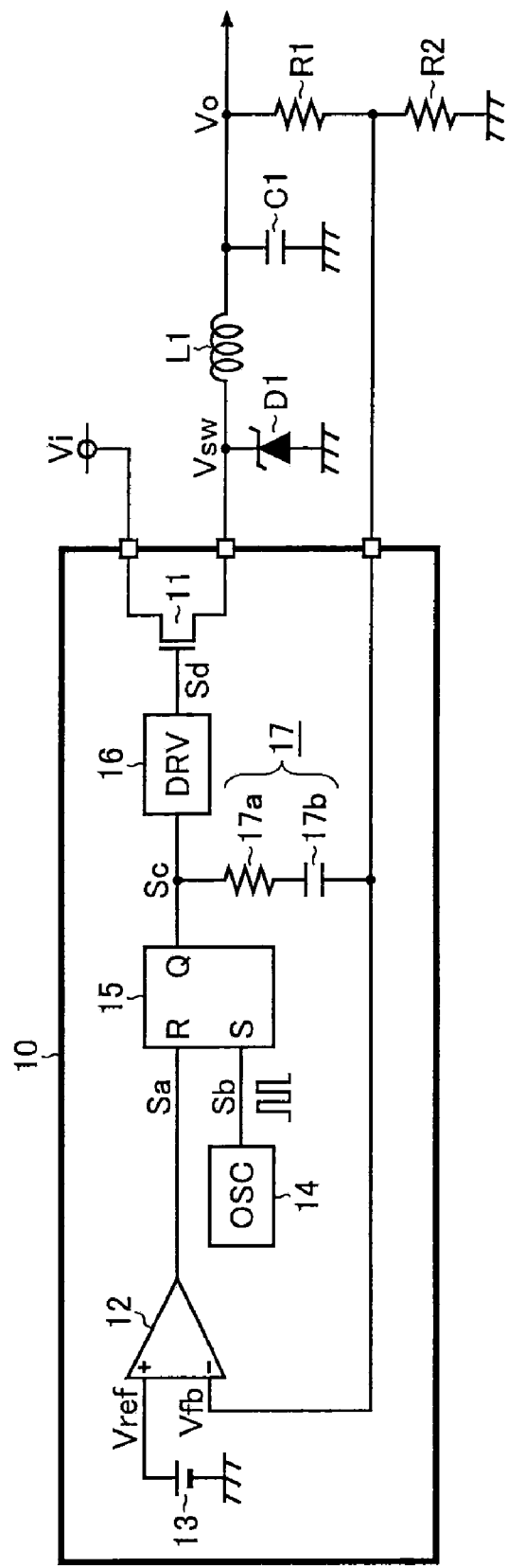
FIG. 1 is a circuit diagram showing an example of the configuration of a switching regulator according to the invention.

FIG. 1 is a circuit diagram showing an embodiment of a switching regulator according to the invention.

As shown in this figure, the switching regulator of this embodiment includes a switching regulator IC 10, and a diode (Schottky diode) D1, an inductor L1, a capacitance C1, and resistors R1 and R2, which are attached externally to the switching regulator IC 10.

The switching regulator IC 10 is a semiconductor device into which an N-channel field-effect transistor (output transistor) 11, a comparator 12, a direct-current voltage source 13, an oscillator 14, a latch circuit (RS flip-flop) 15, a preliminary driver 16, and a phase compensation circuit 17 are integrated.

The drain of the output transistor 11 is connected to a terminal to which an input voltage Vi is applied, and the source thereof is connected to the cathode of the diode D1 and to one end of the inductor L1. The anode of the diode D1 is grounded. The other end of the inductor L1, from which an output voltage Vo is outputted, is connected to a load (not shown), and is grounded via the capacitance Cl and in addition via the resistors R1 and R2.

The non-inverting input terminal (+) of the comparator 12 is connected to the positive terminal (a terminal to which a reference voltage Vref is applied) of the direct-current voltage source 13. The negative terminal of the direct-current voltage source 13 is grounded. The inverting input terminal (−) of the comparator 12 is connected to a terminal (a node at which the resistor R1 and the resistor R2 are connected together) to which a feedback voltage Vfb commensurate with the output voltage Vo is applied.

The reset terminal (R) of the latch circuit 15 is connected to the output terminal of the comparator 12, the set terminal (S) thereof is connected to the output terminal of the latch circuit 15, and the output terminal (Q) thereof is connected to the gate of the output transistor 11 via the preliminary driver 16.

The phase compensation circuit 17 is a circuit in which a resistor 17a and a capacitance 17b are connected in series, and is connected between the output terminal of the latch circuit 15 and the inverting input terminal (−) (a terminal to which the feedback voltage Vfb is applied) of the comparator 12.

The basic operation of the switching regulator configured as described above (how the output voltage Vo is produced) will be described.

A desired output voltage Vo is produced from the input voltage Vi as follows. In the comparator 12, a comparison signal Sa is produced by comparing a feedback voltage Vfb commensurate with the output voltage Vo with a predetermined reference voltage Vref. More specifically, in the comparator 12, the comparison signal Sa takes a high level when the feedback voltage Vfb is lower than the reference voltage Vref; the comparison signal Sa takes a low level when the feedback voltage Vfb is higher than the reference voltage Vref.

On the other hand, in the oscillator 14, a clock signal Sb at a predetermined frequency is produced so as to determine a switching frequency of the output transistor 11.

In the latch circuit 15, based on the comparison signal Sa and clock signal Sb described above, a PWM signal Sc with a desired duty factor is produced. More specifically, in the latch circuit 15, the PWM signal Sc takes a high level at the rising edge of the clock signal Sb; the PWM signal Sc takes a low level at the falling edge of the comparison signal Sa. That is, in the latch circuit 15, once the PWM signal Sc is transitioned to a high level according to the clock signal Sb, the PWM signal Sc is kept at a high level until the feedback voltage Vfb reaches the reference voltage Vref, and, when the feedback voltage Vfb has reached the reference voltage Vref, the PWM signal Sc is transitioned to a low level. Thus, the lower the output voltage Vo is than its target level, the higher the ON duty of the output transistor 11; the closer the output voltage Vo gets to its target level, the lower the ON duty of the output transistor 11.

In the preliminary driver 16, the driving capability of the PWM signal Sc described above is enhanced, whereby a gate signal Sd of the output transistor 11 is produced.

Switching control is performed for the output transistor 11 based the gate signal Sd described above, and a switching voltage Vsw in the form of a rectangular wave is outputted from the source of the output transistor 11. The switching voltage Vsw thus outputted is smoothed by a smoothing circuit consisting of the diode D1, the inductor L1, and the capacitance C1. In this way, the desired output voltage Vo is produced. Incidentally, the output voltage Vo is divided by a voltage divider circuit consisting of the resistors R1 and R2, whereby the aforementioned feedback voltage Vfb is produced.

This feedback control permits the switching regulator of this embodiment to produce a desired output voltage Vo from the input voltage Vi with an extremely simple configuration.

Next, with reference to FIGS. 2 and 3, a phase compensation operation of the switching regulator configured as described above will be described.

Figure 2:
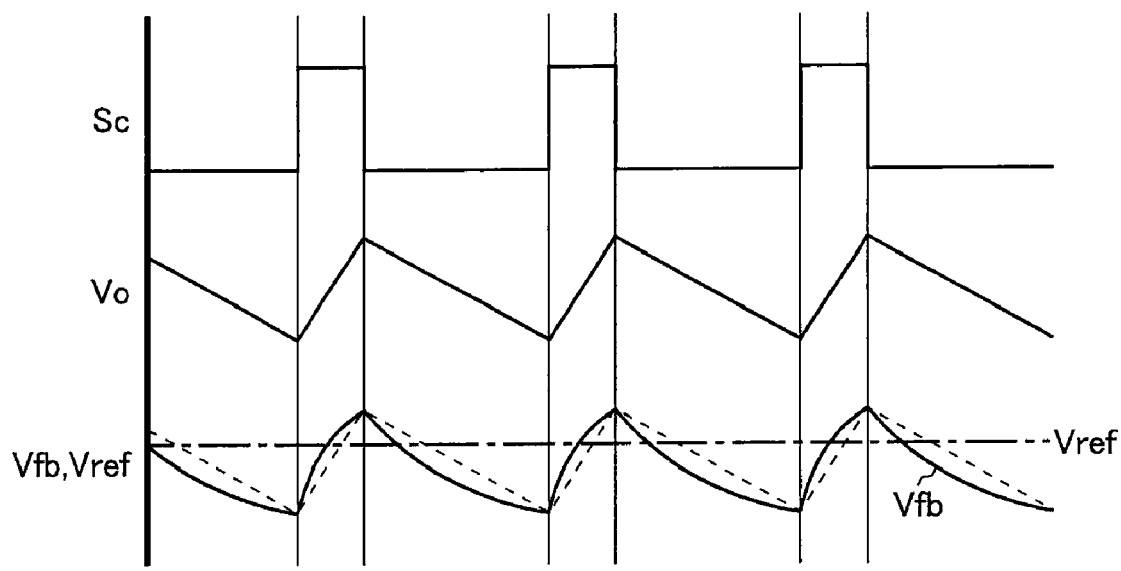
FIG. 2 is a waveform diagram illustrating the operation of the phase compensation circuit 17.
Figure 3:
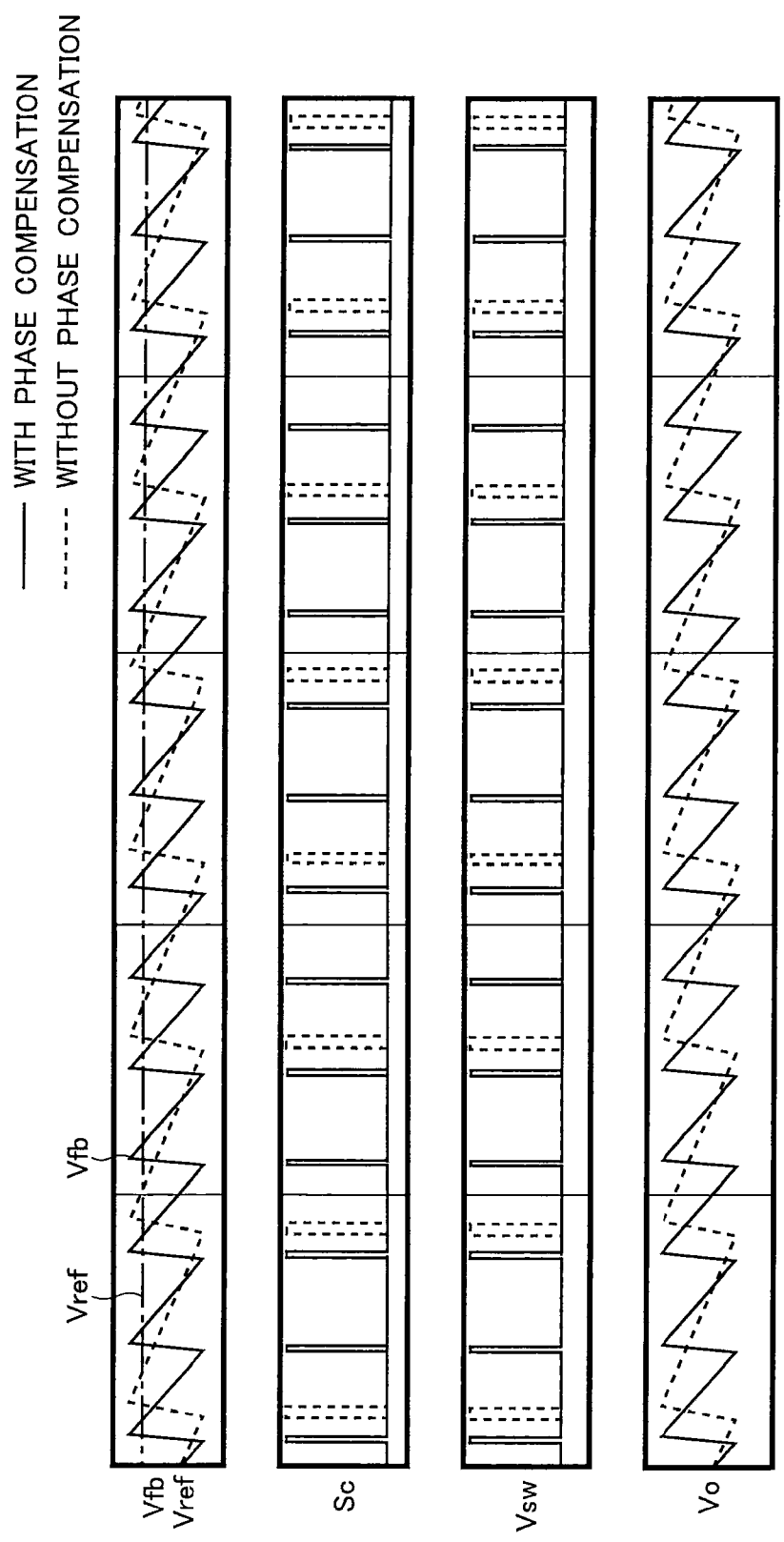
FIG. 3 is a waveform diagram illustrating the workings of the phase compensation circuit 17.
Figure 4:
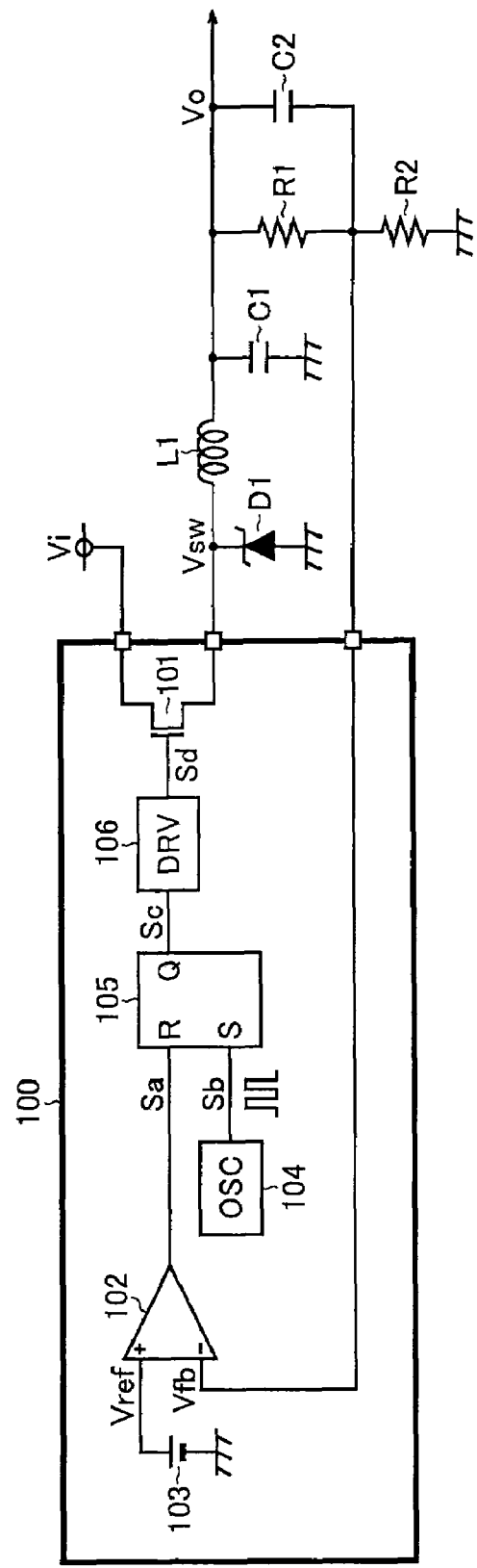
FIG. 4 is a circuit diagram showing an example of the configuration of a conventional switching regulator.

FIG. 2 is a waveform diagram illustrating the operation of the phase compensation circuit 17, and FIG. 3 is a waveform diagram illustrating the workings of the phase compensation circuit 17.

In FIG. 2, the PWM signal Sc, the output voltage Vo, and the feedback voltage Vfb are shown, from top to bottom, with solid lines. For comparison with the feedback voltage Vfb, the reference voltage Vref and a feedback voltage observed when no phase compensation circuit 17 is provided are shown with alternate long and short dashed lines and fine broken lines, respectively.

On the other hand, in FIG. 3, the feedback voltage Vfb, the PWM signal Sc, the switching voltage Vsw, and the output voltage Vo of this embodiment are shown, from top to bottom, with solid lines. For comparison with them, voltage behaviors observed in a case where no phase compensation circuit 17 is provided (in this case, an inevitable delay developed in the operations of the comparator 12, the latch circuit 15, and the preliminary driver 16 increases the pulse widths of the PWM signal Sc and the switching voltage Vsw, producing a switching frequency that is one-half of a desired switching frequency) are shown with broken lines. For comparison with the feedback voltage Vfb, the reference voltage Vref is shown with alternate long and short dashed lines.

As shown in FIG. 2, in the switching regulator of this embodiment, an alternating-current component of the PWM signal Sc is added, via the phase compensation circuit 17, to the feedback voltage Vfb, such that phase lead is introduced to the feedback voltage Vfb.

This makes it possible to alleviate or eliminate the influence of an inevitable delay developed in the operations of the comparator 12, the latch circuit 15, and the preliminary driver 16. Thus, as shown in FIG. 3, it is possible to stabilize the output operation and obtain a desired oscillating frequency.

By introducing phase lead to the feedback voltage Vfb, time that elapses before the feedback voltage Vfb reaches the reference voltage Vref is reduced, and hence the ON duty of the output transistor 11 is intentionally brought down. Thus, with the switching regulator of this embodiment, it is possible to make a subharmonic oscillation less prone to occur. This makes it possible to prevent ripples from appearing, and thereby increase a degree of output accuracy.

The embodiment described above deals with a case in which the invention is applied to a step-down switching regulator. This, however, is not meant to limit the application of the invention in any way; the invention finds wide application in step-up switching regulators.

The invention may be practiced in any other manner than specifically described above, with any modification or variation made within the spirit of the invention.

For example, the embodiment described above deals with the phase compensation circuit 17 configured as a circuit in which the resistor 17a and the capacitance 17b are connected in series. However, the present invention is not limited to this specific configuration; the phase compensation circuit 17 may be configured as a circuit in which a resistor and a capacitance are connected in parallel. Furthermore, any order of phase compensation may be used.

As described above, with the switching regulator according to the invention, it is possible to produce a desired output voltage from an input voltage with stability and a high degree of accuracy.

In terms of industrial applicability, the invention is useful in enhancing the stability of an output voltage and a degree of accuracy thereof in all the applications using switching regulators, such as inkjet printers.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A switching regulator, comprising:
   a comparator producing a comparison signal by comparing a feedback voltage commensurate with an output voltage with a predetermined reference voltage;
   an oscillator producing a clock signal at a predetermined frequency;
   a latch circuit producing a pulse width modulation signal with a desired duty factor based on the comparison signal and the clock signal;
   an output transistor for which switching control is performed based on the pulse width modulation signal, the output transistor having one end from which a switching voltage in a form of a rectangular wave is outputted; and
   a phase compensation circuit connected between an output terminal of the latch circuit and a feedback voltage input terminal of the comparator.

2. The switching regulator of claim 1,
   wherein the phase compensation circuit comprises a circuit in which a resistor and a capacitance are connected in series,
   wherein the phase compensation circuit introduces phase lead to the feedback voltage by adding an alternating-current component of the pulse width modulation signal to the feedback voltage.

3. The switching regulator of claim 1,
   wherein the comparator makes
      the comparison signal take a high level when the feedback voltage is lower than the reference voltage, and
      the comparison signal take a low level when feedback voltage is higher than the reference voltage,
   wherein the latch circuit makes
      the pulse width modulation signal take a high level at a rising edge of the clock signal, and
      the pulse width modulation signal take a low level at a falling edge of the comparison signal.

4. The switching regulator of claim 1, wherein
   the output transistor has one end connected to a terminal to which the input voltage is applied, and has another end from which the switching voltage is outputted.

5. The switching regulator of claim 1, further comprising:
   a preliminary driver producing a control signal of the output transistor by enhancing a driving capability of the pulse width modulation signal.

6. The switching regulator of claim 5, wherein
   the comparator, the oscillator, the latch circuit, the preliminary driver, the output transistor, and the phase compensation circuit are integrated into a semiconductor device.

7. The switching regulator of claim 6, further comprising:
   a smoothing circuit attached externally to the semiconductor device, the smoothing circuit producing a desired output voltage by smoothing the switching voltage; and
   a voltage divider circuit attached externally to the semiconductor device, the voltage divider circuit producing the feedback voltage by dividing the output voltage.

* * * * *